United States Patent [19]

Barnes

[11] 4,162,534
[45] Jul. 24, 1979

[54] PARALLEL ALIGNMENT NETWORK FOR D-ORDERED VECTOR ELEMENTS

[75] Inventor: George H. Barnes, Wayne, Pa.

[73] Assignee: Burroughs Corporation, Detroit, Mich.

[21] Appl. No.: 820,234

[22] Filed: Jul. 29, 1977

[51] Int. Cl.$^2$ .............................................. G06F 7/00
[52] U.S. Cl. ................................................. 364/900
[58] Field of Search ... 364/900 MS File, 200 MS File, 364/716, 736; 307/221 R; 328/37; 365/78, 80, 81

[56] References Cited

U.S. PATENT DOCUMENTS

| | | | |
|---|---|---|---|
| 3,076,181 | 1/1963 | Newhouse et al. | 364/900 X |
| 3,210,737 | 10/1965 | Perry et al. | 364/900 |
| 3,214,738 | 10/1965 | Parrott, Jr. | 364/900 |
| 3,274,556 | 9/1966 | Paul et al. | 364/900 |
| 3,311,896 | 3/1967 | Delmege, Jr. et al. | 364/900 |
| 3,350,692 | 10/1967 | Cagle et al. | 364/900 |
| 3,374,463 | 3/1968 | Muir | 364/900 |
| 3,374,468 | 3/1968 | Muir | 364/900 |
| 3,436,737 | 4/1969 | Iverson et al. | 364/900 |
| 3,510,846 | 5/1970 | Goldschmidt et al. | 364/900 |
| 3,596,251 | 7/1971 | Buchan et al. | 364/900 |
| 3,659,274 | 4/1972 | Kyser | 364/900 |
| 3,747,070 | 7/1973 | Huttenhoff | 364/900 |
| 3,790,960 | 2/1974 | Amdahl et al. | 364/900 |
| 3,812,467 | 5/1974 | Batcher | 364/900 |
| 3,887,799 | 6/1975 | Lindgren | 364/900 X |
| 3,934,132 | 1/1976 | Desmonds | 364/900 |
| 3,961,750 | 6/1976 | Dao | 364/900 |
| 3,967,101 | 6/1976 | Fett | 364/900 X |

Primary Examiner—Melvin B. Chapnick
Attorney, Agent, or Firm—Edward J. Feeney, Jr.; Edmund M. Chung; Leonard C. Brenner

[57] ABSTRACT

An alignment network having N parallel data inputs includes log$_2$N rounded up to the nearest integer of levels, each level therein including N selection gates for providing selectively direct through data flow and incrementally shifted or transposed data flow. The selectable shift amount in each level is equal to $k^{2(L-1)}$ modulo N wherein k is relatively prime to N and is a primitive root of the rank number N, and L is the number of the level. A control signal provided to each level directs whether data flow therethrough is to be direct or transposed.

5 Claims, 9 Drawing Figures

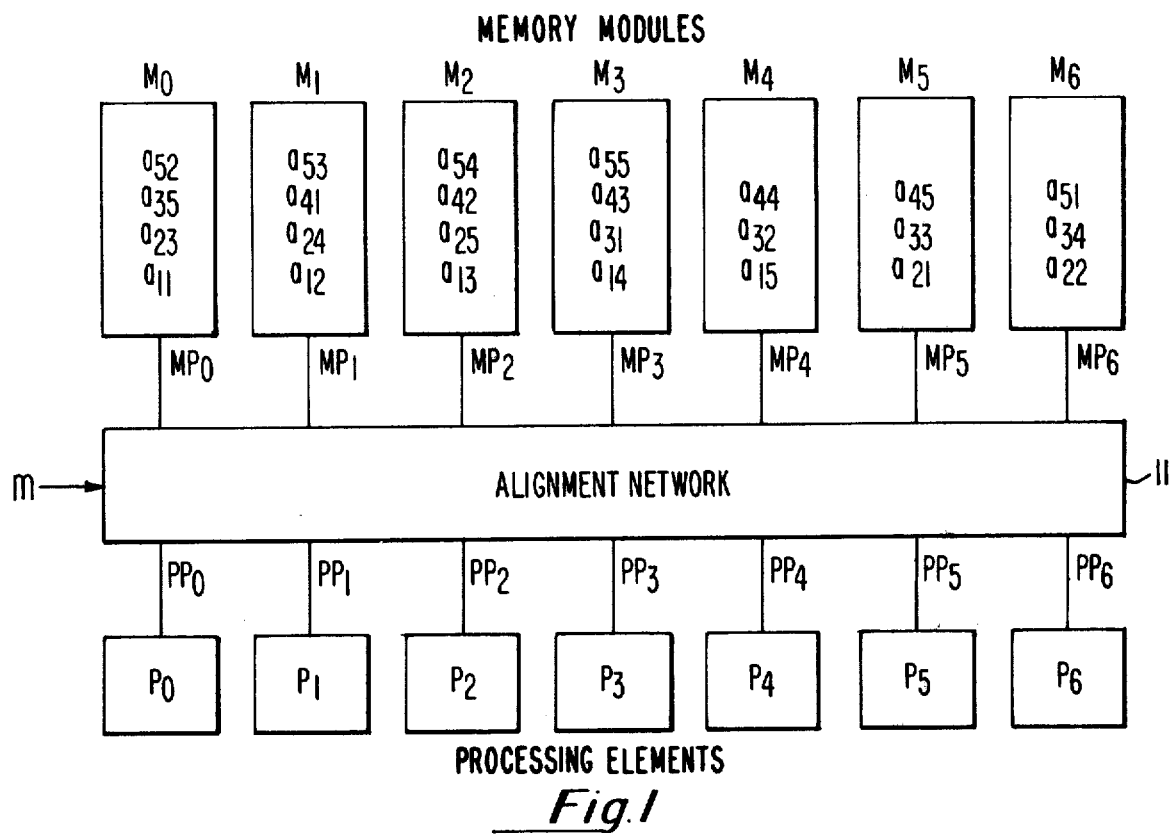
Fig.1
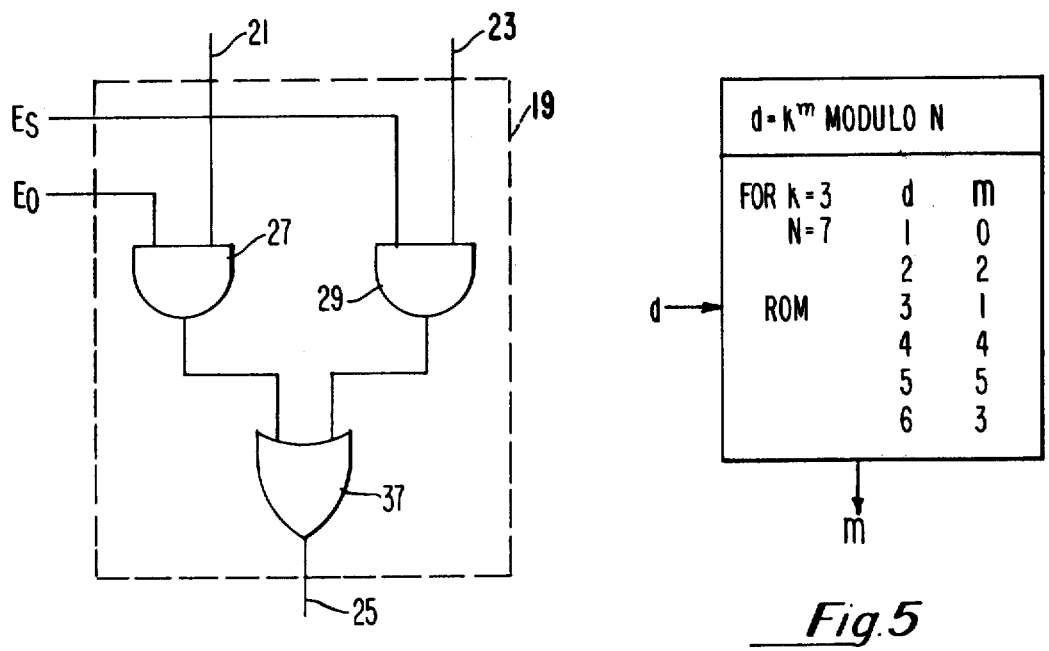
Fig.3
Fig.5

| d | m | d | m | d | m |
|---|---|---|---|---|---|
| 401 | 227 | 451 | 121 | 501 | 428 |
| 402 | 458 | 452 | 478 | 502 | 431 |
| 403 | 426 | 453 | 43 | 503 | 60 |
| 404 | 36 | 454 | 399 | 504 | 447 |
| 405 | 56 | 455 | 357 | 505 | 492 |
| 406 | 9 | 456 | 86 | 506 | 313 |
| 407 | 230 | 457 | 88 | 507 | 69 |
| 408 | 102 | 458 | 273 | 508 | 34 |
| 409 | 503 | 459 | 190 | 509 | 377 |
| 410 | 193 | 460 | 385 | 510 | 38 |
| 411 | 408 | 461 | 429 | 511 | 110 |
| 412 | 123 | 462 | 108 | 512 | 262 |
| 413 | 379 | 463 | 258 | 513 | 174 |
| 414 | 17 | 464 | 432 | 514 | 271 |
| 415 | 210 | 465 | 185 | 515 | 59 |
| 416 | 324 | 466 | 90 | 516 | 312 |
| 417 | 468 | 467 | 61 | 517 | 376 |
| 418 | 267 | 468 | 412 | 518 | 261 |
| 419 | 246 | 469 | 150 | 519 | 58 |
| 420 | 180 | 470 | 448 | 520 | 260 |
| 421 | 480 | 471 | 162 | | |
| 422 | 40 | 472 | 282 | | |
| 423 | 80 | 473 | 493 | | |
| 424 | 66 | 474 | 338 | | |
| 425 | 291 | 475 | 275 | | |
| 426 | 483 | 476 | 314 | | |
| 427 | 136 | 477 | 154 | | |
| 428 | 393 | 478 | 455 | | |
| 429 | 73 | 479 | 70 | | |
| 430 | 45 | 480 | 83 | | |
| 431 | 112 | 481 | 226 | | |
| 432 | 235 | 482 | 35 | | |
| 433 | 472 | 483 | 229 | | |
| 434 | 461 | 484 | 192 | | |
| 435 | 253 | 485 | 378 | | |
| 436 | 499 | 486 | 323 | | |
| 437 | 388 | 487 | 245 | | |
| 438 | 418 | 488 | 39 | | |
| 439 | 401 | 489 | 290 | | |
| 440 | 264 | 490 | 392 | | |
| 441 | 24 | 491 | 111 | | |
| 442 | 279 | 492 | 460 | | |
| 443 | 353 | 493 | 387 | | |
| 444 | 49 | 494 | 263 | | |
| 445 | 27 | 495 | 352 | | |
| 446 | 365 | 496 | 364 | | |
| 447 | 510 | 497 | 175 | | |
| 448 | 359 | 498 | 477 | | |
| 449 | 176 | 499 | 356 | | |
| 450 | 424 | 500 | 272 | | |

*Fig.6C*

| |
|---|
| FIG.6A |
| FIG.6B |
| FIG.6C |

| d | m | d | m | d | m | d | m |
|---|---|---|---|---|---|---|---|
| 1 | 0 | 51 | 188 | 101 | 440 | 151 | 42 |
| 2 | 318 | 52 | 410 | 102 | 506 | 152 | 85 |
| 3 | 1 | 53 | 152 | 103 | 7 | 153 | 189 |
| 4 | 116 | 54 | 321 | 104 | 208 | 154 | 107 |
| 5 | 52 | 55 | 350 | 105 | 64 | 155 | 184 |
| 6 | 319 | 56 | 445 | 106 | 470 | 156 | 411 |
| 7 | 11 | 57 | 172 | 107 | 277 | 157 | 161 |
| 8 | 434 | 58 | 518 | 108 | 119 | 158 | 337 |
| 9 | 2 | 59 | 368 | 109 | 383 | 159 | 153 |
| 10 | 370 | 60 | 169 | 110 | 148 | 160 | 82 |
| 11 | 298 | 61 | 125 | 111 | 453 | 161 | 228 |
| 12 | 117 | 62 | 450 | 112 | 243 | 162 | 322 |
| 13 | 294 | 63 | 13 | 113 | 362 | 163 | 289 |
| 14 | 329 | 64 | 348 | 114 | 490 | 164 | 459 |
| 15 | 53 | 65 | 346 | 115 | 269 | 165 | 351 |
| 16 | 232 | 66 | 97 | 116 | 316 | 166 | 476 |
| 17 | 187 | 67 | 139 | 117 | 296 | 167 | 427 |
| 18 | 320 | 68 | 303 | 118 | 166 | 168 | 446 |
| 19 | 171 | 69 | 218 | 119 | 198 | 169 | 68 |
| 20 | 168 | 70 | 381 | 120 | 487 | 170 | 37 |
| 21 | 12 | 71 | 164 | 121 | 76 | 171 | 173 |
| 22 | 96 | 72 | 436 | 122 | 443 | 172 | 311 |
| 23 | 217 | 73 | 99 | 123 | 344 | 173 | 57 |
| 24 | 435 | 74 | 250 | 124 | 248 | 174 | 519 |
| 25 | 104 | 75 | 105 | 125 | 156 | 175 | 115 |
| 26 | 92 | 76 | 287 | 126 | 331 | 176 | 10 |
| 27 | 3 | 77 | 309 | 127 | 438 | 177 | 369 |
| 28 | 127 | 78 | 93 | 128 | 146 | 178 | 293 |
| 29 | 200 | 79 | 19 | 129 | 196 | 179 | 231 |
| 30 | 371 | 80 | 284 | 130 | 144 | 180 | 170 |
| 31 | 132 | 81 | 4 | 131 | 405 | 181 | 95 |
| 32 | 30 | 82 | 141 | 132 | 415 | 182 | 103 |
| 33 | 299 | 83 | 158 | 133 | 182 | 183 | 126 |
| 34 | 505 | 84 | 128 | 134 | 457 | 184 | 131 |
| 35 | 63 | 85 | 239 | 135 | 55 | 185 | 504 |
| 36 | 118 | 86 | 513 | 136 | 101 | 186 | 451 |
| 37 | 452 | 87 | 201 | 137 | 407 | 187 | 485 |
| 38 | 489 | 88 | 212 | 138 | 16 | 188 | 194 |
| 39 | 295 | 89 | 495 | 139 | 467 | 189 | 14 |
| 40 | 486 | 90 | 372 | 140 | 179 | 190 | 21 |
| 41 | 343 | 91 | 305 | 141 | 79 | 191 | 409 |
| 42 | 330 | 92 | 333 | 142 | 482 | 192 | 349 |
| 43 | 195 | 93 | 133 | 143 | 72 | 193 | 517 |
| 44 | 414 | 94 | 396 | 144 | 234 | 194 | 124 |
| 45 | 54 | 95 | 223 | 145 | 252 | 195 | 347 |
| 46 | 15 | 96 | 31 | 146 | 417 | 196 | 138 |
| 47 | 78 | 97 | 326 | 147 | 23 | 197 | 380 |
| 48 | 233 | 98 | 340 | 148 | 48 | 198 | 98 |
| 49 | 22 | 99 | 300 | 149 | 509 | 199 | 286 |
| 50 | 422 | 100 | 220 | 150 | 423 | 200 | 18 |

Fig.6B

| d | m | d | m | d | m | d | m |
|---|---|---|---|---|---|---|---|
| 201 | 140 | 251 | 113 | 301 | 206 | 351 | 297 |
| 202 | 238 | 252 | 129 | 302 | 360 | 352 | 328 |
| 203 | 211 | 253 | 515 | 303 | 441 | 353 | 186 |
| 204 | 304 | 254 | 236 | 304 | 403 | 354 | 167 |
| 205 | 395 | 255 | 240 | 305 | 177 | 355 | 216 |
| 206 | 325 | 256 | 464 | 306 | 507 | 356 | 91 |
| 207 | 219 | 257 | 473 | 307 | 335 | 357 | 199 |
| 208 | 6 | 258 | 514 | 308 | 425 | 358 | 29 |
| 209 | 469 | 259 | 463 | 309 | 8 | 359 | 62 |
| 210 | 382 | 260 | 462 | 310 | 502 | 360 | 488 |
| 211 | 242 | 261 | 202 | 311 | 122 | 361 | 342 |
| 212 | 268 | 262 | 203 | 312 | 209 | 362 | 413 |
| 213 | 165 | 263 | 254 | 313 | 266 | 363 | 77 |
| 214 | 75 | 264 | 213 | 314 | 479 | 364 | 421 |
| 215 | 247 | 265 | 204 | 315 | 65 | 365 | 151 |
| 216 | 437 | 266 | 500 | 316 | 135 | 366 | 444 |
| 217 | 143 | 267 | 496 | 317 | 44 | 367 | 367 |
| 218 | 181 | 268 | 255 | 318 | 471 | 368 | 449 |
| 219 | 100 | 269 | 389 | 319 | 498 | 369 | 345 |
| 220 | 466 | 270 | 373 | 320 | 400 | 370 | 302 |
| 221 | 481 | 271 | 214 | 321 | 278 | 371 | 163 |
| 222 | 251 | 272 | 419 | 322 | 26 | 372 | 249 |
| 223 | 47 | 273 | 306 | 323 | 358 | 373 | 308 |
| 224 | 41 | 274 | 205 | 324 | 120 | 374 | 283 |
| 225 | 106 | 275 | 402 | 325 | 398 | 375 | 157 |
| 226 | 160 | 276 | 334 | 326 | 87 | 376 | 512 |
| 227 | 81 | 277 | 501 | 327 | 384 | 377 | 494 |
| 228 | 288 | 278 | 265 | 328 | 257 | 378 | 332 |
| 229 | 475 | 279 | 134 | 329 | 89 | 379 | 222 |
| 230 | 67 | 280 | 497 | 330 | 149 | 380 | 339 |
| 231 | 310 | 281 | 25 | 331 | 281 | 381 | 439 |
| 232 | 114 | 282 | 397 | 332 | 274 | 382 | 207 |
| 233 | 292 | 283 | 256 | 333 | 454 | 383 | 276 |
| 234 | 94 | 284 | 280 | 334 | 225 | 384 | 147 |
| 235 | 130 | 285 | 224 | 335 | 191 | 385 | 361 |
| 236 | 484 | 286 | 390 | 336 | 244 | 386 | 315 |
| 237 | 20 | 287 | 354 | 337 | 391 | 387 | 197 |
| 238 | 516 | 288 | 32 | 338 | 386 | 388 | 442 |
| 239 | 137 | 289 | 374 | 339 | 363 | 389 | 155 |
| 240 | 285 | 290 | 50 | 340 | 355 | 390 | 145 |
| 241 | 237 | 291 | 327 | 341 | 430 | 391 | 404 |
| 242 | 394 | 292 | 215 | 342 | 491 | 392 | 456 |
| 243 | 5 | 293 | 28 | 343 | 33 | 393 | 406 |
| 244 | 241 | 294 | 341 | 344 | 109 | 394 | 178 |
| 245 | 74 | 295 | 420 | 345 | 270 | 395 | 71 |
| 246 | 142 | 296 | 366 | 346 | 375 | 396 | 416 |
| 247 | 465 | 297 | 301 | 347 | 259 | 397 | 508 |
| 248 | 46 | 298 | 307 | 348 | 317 | 398 | 84 |
| 249 | 159 | 299 | 511 | 349 | 51 | 399 | 183 |
| 250 | 474 | 300 | 221 | 350 | 433 | 400 | 336 |

PARALLEL ALIGNMENT NETWORK FOR D-ORDERED VECTOR ELEMENTS

CROSS REFERENCE TO RELATED APPLICATION

The invention described herein was made in the performance of work under NASA Contract Number NAS 2-9456 and is subject to the provisions of Section 305 of the National Aeronautics and Space Act of 1958 (72 Stat. 435, 42 U.S.C. 2457).

In copending application, Ser. No. 682,526, now U.S. Pat. No. 4,051,551 for a "Multidimensional Parallel Access Computer", filed in the name of D. H. Lawrie et al, and assigned to the assignee of present invention, there is described and claimed a parallel data processing system for storing and fetching d-ordered vectors. Although not limited thereto, the present alignment network invention may be used with or in such a system.

BACKGROUND OF THE INVENTION

The present invention relates to an alignment network for use in a parallel data processing environment. More particularly, the present invention finds application in unscrambling a d-ordered vector having its elements stored a distance d apart from each other in the parallel memory modules of a parallel data processor.

In the prior art, as disclosed in U.S. Pat. application, Ser. No. 682,526, filed May 3, 1976, now U.S. Pat. No. 4,051,551 in the names of D. H. Lawrie and C. R. Vora and assigned to the assignee of the present invention, there is described a cross-bar network for transferring and alignment data between a set of parallel memory modules and a set of parallel processors. The cross-bar network so disclosed is relatively easy to program or control; however, it is also relatively costly in components requiring $N^2$ elementary elements to transmit data through wherein N is the number of parallel memory modules storing data to be aligned.

Other prior art networks require fewer components but present difficult control problems. Typical of this type of alignment network is the Benes network requiring only 2N log N elements, see Benes, V. E., "Optimal Rearrangeable Multi-stage Connecting Networks, Part 2," Bell System Technical Journal Vol. 43, 1964, p. 1641.

Still other prior art alignment networks which require fewer components than the cross-bar network and are not too difficult to control or program require multiple data flow transitions cycling through a single alignment layer thereby increasing the time required for data to pass through the network, see Roger C. Swanson, "Interconnecting for Parallel Memories to Unscramble p-Ordered Vectors", IEEE Trans. Computers, Nov. 1974. Swanson's "p-Ordered Vector" corresponds to the "d-ordered vector" terminology used herein.

Therefore, it is an object of the present invention to provide an alignment network for d-Ordered Vectors requiring fewer components than a cross-bar network and yet being easy to control.

It is yet another object of the invention to provide alignment for d-Ordered Vectors while requiring only a single pass through any of the elements used for alignment.

SUMMARY OF THE INVENTION

The above and other objects of the inventions are realized through an alignment network for use with a parallel data system having N parallel modules, the alignment network having $\log_2 N$ (rounded up to the nearest integer) levels wherein each level includes N selection elements for providing selectively direct through data flow and incrementally shifted or transposed data flow. The amount of shifting a transposition in each level is equal to $k^{2(L-1)}$ modulo N wherein k is relatively prime to N and is a primitive root of N and L is the number (or rank) of the level. A control signal provided to each level directs whether data flow therethrough is to be direct or transposed.

BRIEF DESCRIPTION OF THE DRAWINGS

The above objects and advantages and features of the present invention will become more readily apparent from a review of the following specification in relation with the drawings wherein:

FIG. 1 is a block diagram illustrating a typical operating environment of the present alignment network invention;

FIG. 3 is a logic diagram of a two-input selection gate used in the alignment network of FIG. 2;

FIG. 5 is an illustration of a read-only memory (ROM) programmed to provide a control word for the alignment networks of FIG. 2 and FIG. 4; and FIG. 6 comprising FIGS. 6A, 6B and 6C, is a presentation in tabular format of the generation of control words for an alignment network operating with 521 parallel memory modules.

DETAILED DESCRIPTION OF THE PREFERRED EMBODIMENT

With reference to FIG. 1, the alignment network of the present invention interfaces between a plurality of memory modules M0-M6 and a plurality of processing elements P0-P6. Data stored in the memory modules M0-M6 may be accessed in parallel through Memory Ports MP-MP1, aligned in the Alignment Network 11 as directed by control word m, and fed through Processing Ports PP0-PP6 for parallel processing by the Processing Elements P0-P6. Although seven Memory Modules M0-M6 and seven Processing Elements P0-P6 are shown in FIG. 1, in alternate embodiments, other system arrangements having differing numbers of Memory Modules and Processing Elements may be used, see U.S. Pat. application Ser. No. 682,526 filed May 3, 1976, now U.S. Pat. No. 4,051,551, issued Sept. 27, 1977 by D. H. Lawrie et al for a "Multidimensional Parallel Access Computer Memory System.", assigned to the assignee of the present invention.

For purposes of illustration, a 5×5 two-dimensional matrix comprising Data Elements $a_{11}$ through $a_{55}$ is shown loaded into Memory Modules M0-M6. To process in parallel Data Elements $a_{11}$, $a_{12}$, $a_{13}$, $a_{14}$, and $a_{15}$ the Alignment Network need merely establish a direct data flow path between Memory Ports MP0, MP1, MP2, MP3 and MP4 and Processing Ports MP0, PP1, PP2, PP3 and PP4, respectively. However, to process in parallel data elements $a_{11}$, $a_{21}$, $a_{31}$, $a_{41}$ and $a_{51}$ the alignment network must perform in essence a shifting operation to direct the data elements $a_{11}$, $a_{21}$, $a_{31}$, $a_{41}$ and $a_{51}$ to processors P0, P1, P2, P3 and P4, respectively.

As can be seen, each data element in the set $a_{11}, a_{21}, a_{31}, a_{41}$ and $a_{51}$ is shifted five Memory Modules (modulo 7) from the preceding data element. The shift occurs modulo 7 since there are seven memory modules (M0-M6). In general, the required shift would occur modulo N where N equals the number of memory modules.

Figure 2:
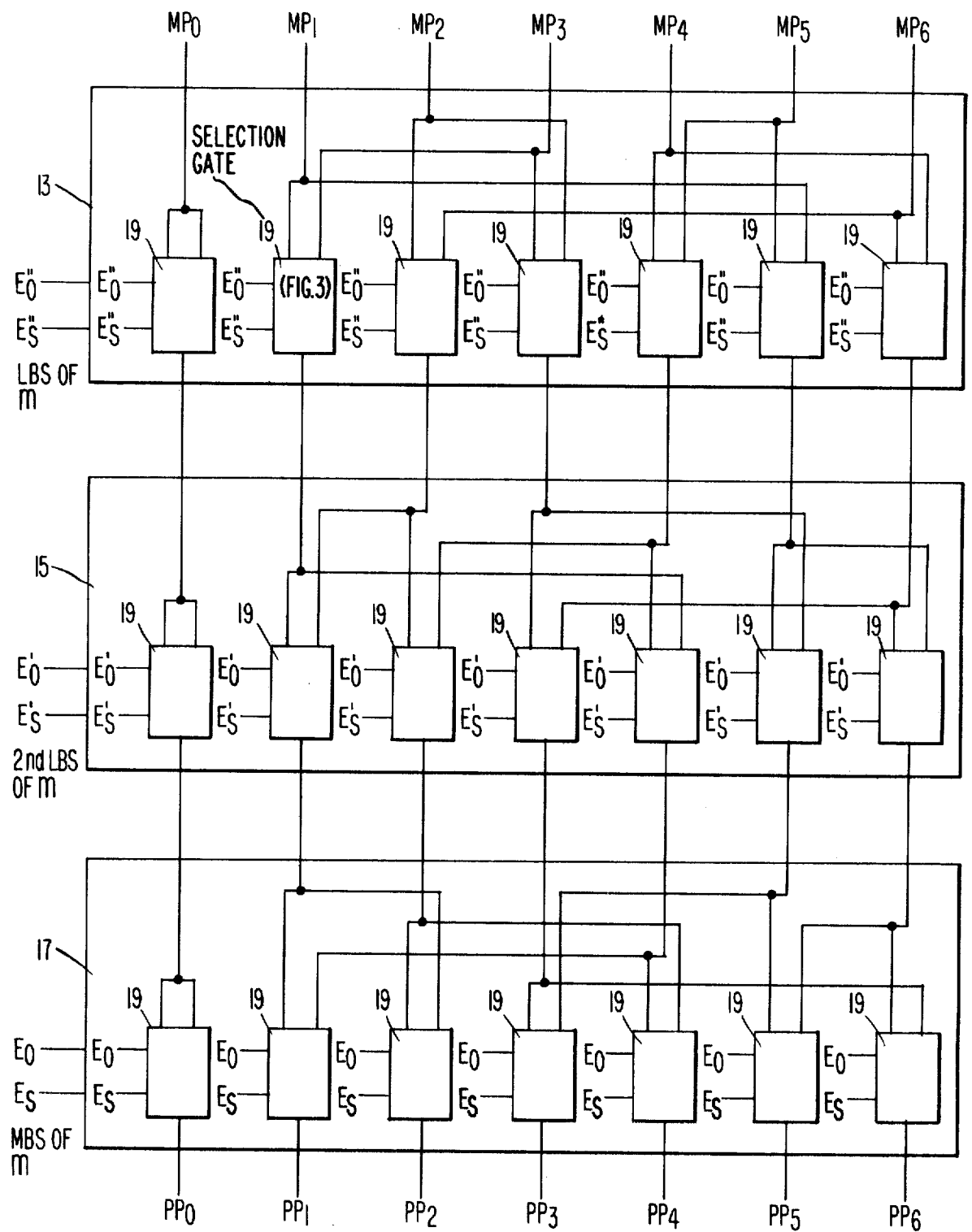
FIG. 2 is a block diagram of an arrangement of the alignment network of the present invention suitable for use in the environment of FIG. 1.

For illustrative purposes, a specific example of how the alignment network 11 of the present invention functions will be examined, followed by a more general approach to extend the application of the present invention to more universal situations. With reference to FIG. 2, the alignment network 11 having seven (7) Memory ports MP0-MP6 and seven (7) Processing Ports PP0-PP6 is partitioned into a first level 13, a second level 15 and a third level 17.

Each level 13, 15 and 17 includes seven (7) two-input selection gates 19, each having a first input 21, a second input 23, an output 25 and two selection control inputs EO and ES, see FIG. 3. For purposes of discussion, the control inputs of the selection gates 19 in the first level 13 are designated EO″ and ES″ while the control inputs of the selection gates 19 in the second level 15 are designated EO′ and ES′. When a logical one or true level is present on the EO (or EO′, EO″) control input, a data communications path is provided between the first input 21 and the output 25. With a logical one or true level present on the ES (or ES′, ES″) control input, a data communications path is provided between the second input 23 and the output 25. All control inputs EO and ES are fashioned to receive complementary binary levels, so that a true or logical one level at EO implies a false or logical zero level at ES and vice-versa. The preferred embodiment fabrication of the simple two-input selection gate 19 will be detailed hereinafter.

All selection gates 19 in a given level 13, 15 or 17 have their control inputs EO and ES connected in parallel. Thus, three bits of a control word m determines the data flow or shifting between the memory ports MP0-MP6 and the processing ports PP0-PP6. The most significant bit of m controls level 17, the second most significant bit controls level 15, and the least significant bit controls level 13. In essence the control word m provides control to the ES input of the selection gates 19 while a binary complement of m feeds the EO input of the gates 19.

With continued reference to FIG. 2, it can be seen that a control word m of 000 would introduce no shifting and thus direct data flow would occur between memory ports MP0-MP6 and processing ports PP0-PP6, respectively. For a control word m of 100, a shift of 4 (modulo 7) would occur in level 17 with no shift in levels 13 and 15. Likewise, a control word m of 010 would introduce a shift of 2 (modulo 7) in level 15 and a control word m of 001 would introduce a shift of 3 (modulo 7) in level 13. Shifts may occur, of course, in more than one level. For example, a control word m of 111 would generate a shift in all three levels 13, 15 and 17. However, in practice, for the alignment network 11 as shown in FIG. 2, controls words 110 and 111 are not required since the same shift amount occurs using 000 and 001 respectively.

The selection gate 19 is readily fashioned from a first AND gate 27, a second AND gate 29 and an OR gate 37, see FIG. 3. The AND gate 27 is fed by EO and by direct input 21. The AND gate 29 is fed by ES and shift input 23. The OR gate 37 is fed by both AND gates 27 and 29 and provides output 25. In some logic families the OR gate 37 may be fabricated as a "wired-OR" rather than as an actual physical gate.

Figure 4:
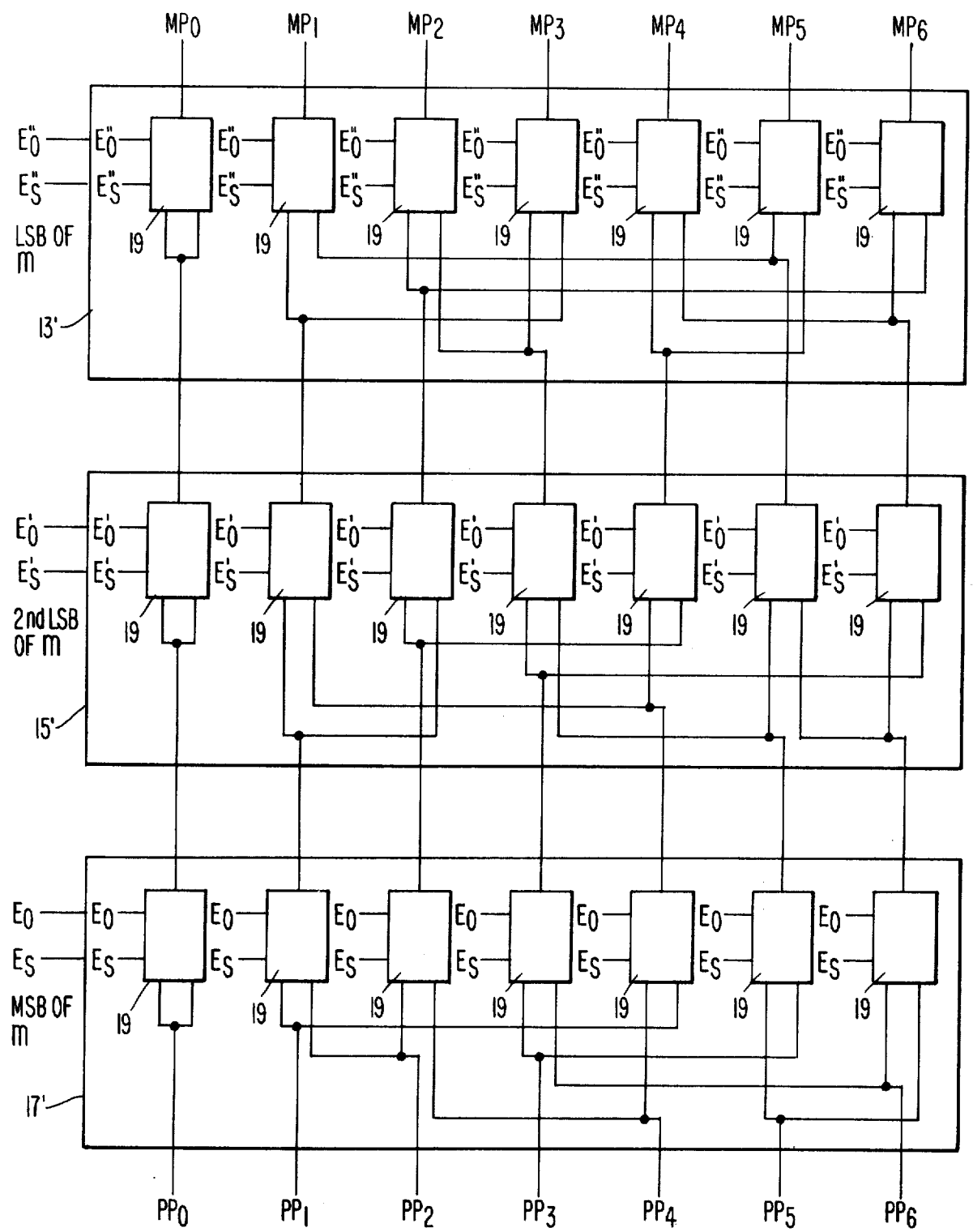
FIG. 4 is a return flow alignment network to complement the alignment network of FIG. 2.

The selection gate 19 fabrication as above described is unidirectional in that it provides data flow only from the memory ports MP0-MP6 to the processing ports PP0-PP6. Therefore, a reverse path must be provided to permit data to flow from the processing ports PP0-PP6 to the memory ports. Such reverse flow is easily provided for, see FIG. 4, by providing a first level 13′, a second level 15′ and a third level 17′.

Each level 13′, 15′ and 17′ includes seven (7) two-input selection gates 19, each for transferring data back to the memory ports MP0-MP6 in the same manner in which the data was transferred to the processing ports PP0-PP6, see FIG. 2. By comparing FIG. 2 with FIG. 4, one can see that under the control of a single control word m, data can be pulled from the memory ports MP0-MP6, sent to the desired processing ports PP0-PP6 and returned back to the memory ports MP0-MP6 from whence it came. Each level 13′, 15′ and 17′ of FIG. 4 corresponds to the levels 13, 15 and 17 respectively of FIG. 2 in that the reversed data flow is channeled back to the memory ports MP0-MP6 in the same manner in which it is flowed to the processing ports PP0-PP6.

The alignment network 11 above described for a system having seven (7) memory ports may be extended to the general case wherein the number of memory ports equals N. In the general case, the alignment network 11 includes a plurality of levels, each level including N number of two-input selection gates 19. The number of levels is equal to $\log_2(N)$ rounded up to the nearest integer. In the above example, N equalled 7 and $\log_2(N)$ rounded up to the nearest integer equalled 3. The total number of gates 19 required in the general case is then N multiplied by $\log_2 N$ rounded up to the nearest integer.

Each level of the alignment network 11 either allows data to flow directly through or provides a data shift depending upon the control word m and more particularly upon the voltage levels applied to the ES and EO of each selection gate 19. The amount of shift in each level is equal to $k^{2(L-1)}$ modulo N, where k is relatively prime to N and is a primitive root of N, N is the number of memory modules, and L is the alignment network 11 level ranking. For example, referring to FIG. 2, wherein k=3, the shift occuring in the first level 13 is $3^{2(1-1)} = 3$. In the second level 15, the shift is $3^{2(2-1)}$ modulo 7=2. The third level 17 shift is $3^{2(3-1)}$ modulo 7=4.

In operation, the distance d (which is the distance between elements sought to be accessed) is known and the value m must be generated. For example, in FIG. 1, to access the elements $a_{11}, a_{12}, a_{13}, a_{14}$ and $a_{15}$ the distance d is unity and no shifting is required through the alignment network. Hence, it is clear in this case that m must equal zero. However, to access the data elements $a_{11}, a_{21}, a_{31}, a_{41}$ and $a_{51}$, the distance d is equal to five (5) and the control word m must be calculated to generate the proper shift through the alignment network 11.

The calculation of m is derived from the relationship $d = k^m$ modulo N, see FIG. 5, which illustrates the generation of m for the system of FIG. 2. In the preferred embodiment the value d is used to address a ROM which has been programmed to the equation $d = k^m$ modulo N to produce the value m at address d. FIG. 5 illustrates the generation of m for values of d in a system having k=3 and N=7. Alternatively, of course, m could be generated by software given the values of d, k, and N. However, hardware generation of m is preferred since in parallel processors, speed is nearly always of the essence.

The alignment network 11 shown in FIG. 2 was developed for a system of seven (7) memory modules and a k of 3. Other arrangements may, of course, be developed. For example, in a system having seventeen (17) memory modules, a k of 3, 5, 6, 7, 10, 11, 12 or 14 may be used. FIG. 6 illustrates in tabular format the generation of m for a system having k=3 and the number (N) of memory modules equal to 521.

Other arrangements of the present invention may be fabricated. As an illustrative example, referring to FIG. 2, levels may be combined in parallel rather than serial. If two levels were combined, for example, level 13 and level 15, each selection gate 19 would require four inputs instead of two to provide for the shift required in level 13, the shift of level 15, the combined shift of levels 13 and 15, and direct through data flow. Hence, the design trade-off is the complexity of gates 19 versus an increased number of gates 19 and an increased number of levels.

Parallelism may be carried even further by combining all levels 13, 15 and 17 and by using eight-input selection gates 19.

Further, in certain applications it may be desirable to insert data storing, shifting or processing apparatus between the alignment network of the present invention and the parallel memory modules storing the data to be aligned. For example, one such apparatus would be an Electronic Barrel Switch For Data Shifting of the type disclosed by R. A. Stokes et al in U.S. Pat. No. 3,610,903. The disclosed Barrel Switch comprises a matrix of gates arranged in rectangular configuration and adapted to shift in a single clock time a multibit parallel input a preselected number of places to the left or right, either end-off or end-around. The Barrel Switch insertion permits d-ordered vectors stored in memory at various starting or base locations to be shifted to a left-most memory starting location for processing through the alignment network.

Other obvious modifications are apparent. For example, with reference to FIGS. 2 and 4, it can be appreciated that the furthest left-most selection gate 19 in all levels 13, 15 and 17 provides only direct through data flow regardless of control word m. Hence, in many applications, the left-most selection gate 19 may be deleted.

Thus, while particular embodiments of the present invention have been described and illustrated, it will be apparent to those skilled in the art that changes and modifications may be made therein without departure from the spirit and scope of the invention.

What is claimed is:

1. A parallel data access alignment network for aligning data between N input ports and N output ports wherein N is an integer greater than one, said data comprising d-ordered vector data elements spaced d modulo N input ports apart, said network comprising:

a plurality of $\log_2 N$ rounded up to the nearest integer of ordered levels serially connected between said N input and N output ports, each said ordered level including;

a plurality of N input channels for receiving in parallel data from the preceding ordered level in said plurality of ordered levels with said plurality of N input channels of the lowest ordered level receiving in parallel data from said N input ports, a plurality of N output channels for sending in parallel data to the succeeding level in said plurality of ordered levels with said plurality of N output channels of the highest ordered level sending in parallel data to said N output ports, means for providing direct data flow between one input channel in said N input channels and one output channel to said N output channels, and means responsive to a transposition control signal for providing selectively direct data flow and transposed data flow between all other channels in said N input and N output channels, said transposed data flow provided being equal in number of channels transposed to k raised to the power 2 raised to the power (L-1) wherein k is relatively prime to N and is a primitive root of N and L is the order of the level in said plurality of ordered levels; and transposition selection means for selecting levels in said plurality of ordered levels for transposed data flow, said transposition selection means providing said transposition control signal therefor generated from the relationship $d = k^m$ modulo N wherein di is said d-ordered vector data element input port spacing, k is said prime relative to N, N is said integer greater than one, and m is said transposition control signal expressed in binary form with said least significant bit of m provided to said lowest ordered level in said plurality of ordered levels, said increasingly significant bits of m provided individually and respectively to said increasing order of levels in said plurality thereof and said most significant bit of m provided to said highest ordered level in said plurality of ordered levels.

2. The parallel data access alignment network according to claim 1 wherein said means for providing selectively direct data flow and transposed data flow includes:

a plurality of N-1 two-input selection gates, each selection gate thereof individually outputted to an individual output channel in said plurality of N output channels.

3. The parallel data access alignment network according to claim 2 wherein each selection gate in said plurality thereof includes:

means responsive to binary control signals for controlling between which of the two inputs thereof and the output thereof data flow is selected.

4. The parallel data access alignment network according to claim 1 wherein said transposition selection means includes:

a memory addressed by said d and outputting said m in accord with said relationship $d = k^m$ modulo N.

5. The parallel data access alignment network according to claim 4 within said memory is a read-only memory.

* * * * *